United States Patent

Norian et al.

[15] 3,668,414

[45] June 6, 1972

[54] TRANSITION INTEGRATION SWITCHING AMPLIFIER

[72] Inventors: Roger F. Norian, Rochester; Virgil H. Koning, Henrietta, both of N.Y.

[73] Assignee: Xerox Corporation, Rochester, N.Y.

[22] Filed: Mar. 31, 1970

[21] Appl. No.: 24,287

[52] U.S. Cl. ............................. 307/104, 318/558, 317/123, 317/DIG. 6
[51] Int. Cl. ......................................................... G05f 1/08
[58] Field of Search ......................... 318/599, 681, 558, 138; 307/104; 317/123, DIG. 6

[56] References Cited

UNITED STATES PATENTS

| | | | |
|---|---|---|---|
| 3,351,834 | 11/1967 | Gerum | 318/138 X |
| 3,471,762 | 10/1969 | Urban | 318/138 |
| 3,293,495 | 12/1966 | Smith | 317/11 |
| 3,051,932 | 8/1962 | Cressy et al. | 318/681 X |
| 3,523,228 | 8/1970 | Currie et al. | 318/681 X |

*Primary Examiner*—Benjamin Dobeck
*Attorney*—James J. Ralabate, Franklyn C. Weiss and John E. Beck

[57] ABSTRACT

A transition integration switching amplifier for controlling the application of a source voltage for driving an inductive load such as a four-pole, capacitor phased, hysteresis synchronous motor. Symmetrical circuits are provided wherein identical signals of opposite phase control the operation of transistor switches for application of the voltage source to a center tapped motor stator. The signals would be applied to a coupling transistor, the output of which controls the input of the transistor switches. A collector to base capacitor forces a controlled transition between the saturated and cut-off states of the transistor and eliminates any high voltage transients across the transistor that may arise due to energy stored in the inductance of the motor stator.

5 Claims, 4 Drawing Figures

TRANSITION INTEGRATION SWITCHING AMPLIFIER

BACKGROUND

Inductive loads such as motors, transformers, relays and solenoids may of course be operated by direct connections to the line potential as supplied by the local utility. Often, however, a more accurate operating frequency signal must be used due to the fact that the line frequency may vary in excess of stringent operating conditions. Local signal sources are utilized, therefore, for maintaining closer control on the characteristics of the signal such as frequency, current and voltage.

With any of the supply potentials mentioned above, certain problems arise in the driving of an inductive load. The inductance in the drive load may cause large voltage and current transients to appear in the drive circuitry which could possibly destroy or otherwise harm the components in the circuit itself. Even if the transients are not large enough to be destructive, electrical noise may be generated which may be just as undesirable. With the desirability of driving such an inductive load without adverse effects of voltage and current transients on the drive circuitry, it becomes increasingly important that adequate circuitry be designed in order to provide an efficient, low cost but reliably operating drive circuit.

OBJECTS OF THE INVENTION

It is, accordingly, an object of the present invention to provide an inductive drive circuit for maintaining a precise drive signal while protecting the circuit from signal transients and other noise effects in the system.

It is another object of the present invention to provide a trapezoidal wave signal output from a square wave signal input to an inductive load with reduced effects of inductance transients by controlling the rise and fall times of the output signal.

It is another object of the present invention to provide a transition integration switching circuit for reducing the effects of voltage and current transients by integrating the input signal to control the waveshape of the switched signal.

BRIEF SUMMARY OF THE INVENTION

In accomplishing the above and other desired aspects of the present invention, Applicants have invented improved apparatus for reducing the effects of transients in a switching circuit which maintains accurate frequency signals to an inductive load. After coupling a square wave signal to the input of the circuit, a switching transistor is energized and deenergized accordingly to connect and disconnect a voltage source to the inductive load. Capacitor feedback between the collector-base junction of the switching transistor is provided to eliminate effects of voltage transients caused by the energy stored in the inductive load coupled thereto. A symmetrical circuit coupled thereto is provided which operates in the same manner on a signal 180° out of phase from the other input signals.

BRIEF DESCRIPTION OF THE DRAWING

For a better understanding of the invention as well as other objects and further features thereof, reference is made to the following detailed description taken in conjunction with the accompanying drawing wherein.

DETAILED DESCRIPTION OF THE INVENTION

The circuitry hereinafter described was designed to drive a four-pole, capacitor phased, hysteresis synchronous motor with a high degree of reliability. Other design targets were optimum efficiency, optimum gain, minimum cost and minimum transient generation. It is apparent, however, to one skilled in the art that the circuitry of the present invention could be used to maintain an accurate frequency signal with reduced noise and transient effects to most inductive loads within the limits set forth by the circuitry herein.

Coupled to input 1 is a square wave signal of, for example, 90 or 100 Hz. This signal may have a voltage range of, for example, ground to a 10 volt amplitude. The signal applied to input 1 is coupled to the base of transistor Q8. Diode CR12 with its cathode connected to the input line and its anode connected to ground, effectively ensures that only voltages of −0.7 volts and above appear on the input to transistor Q8. That is, any voltages below −0.7 bolts, the internal drop of diode D12 itself, would be shunted to ground through the diode. Resistor R16, coupled to a negative voltage source such as −14 volts, operates to turn transistor Q8 off quickly after the input signal drops to ground. The collector of transistor Q8 is coupled to a positive voltage supply through resistor R18, which establishes the operating region of transistor Q8.

Figure 1:
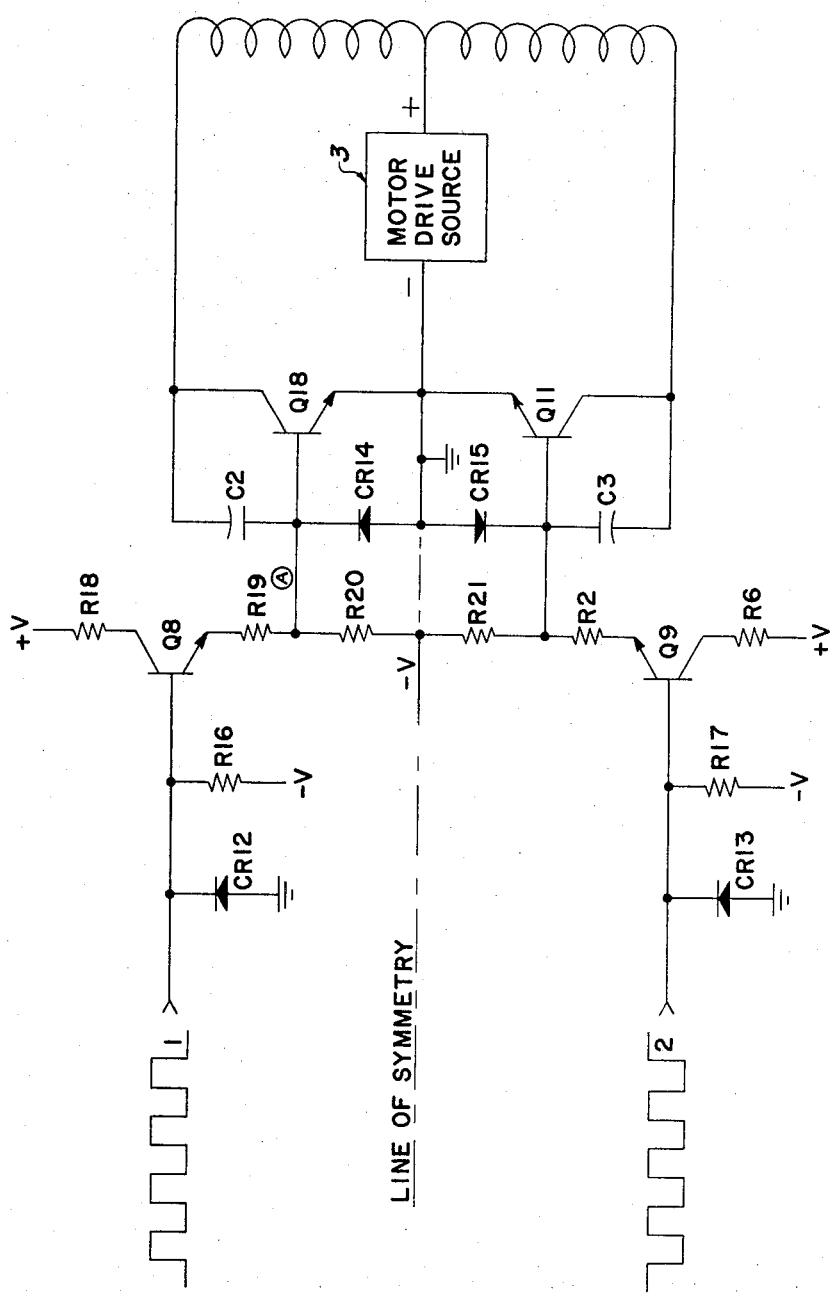
FIG. 1 is a schematic drawing of the circuitry utilized in accomplishing the principles of the present invention.
Figure 2:
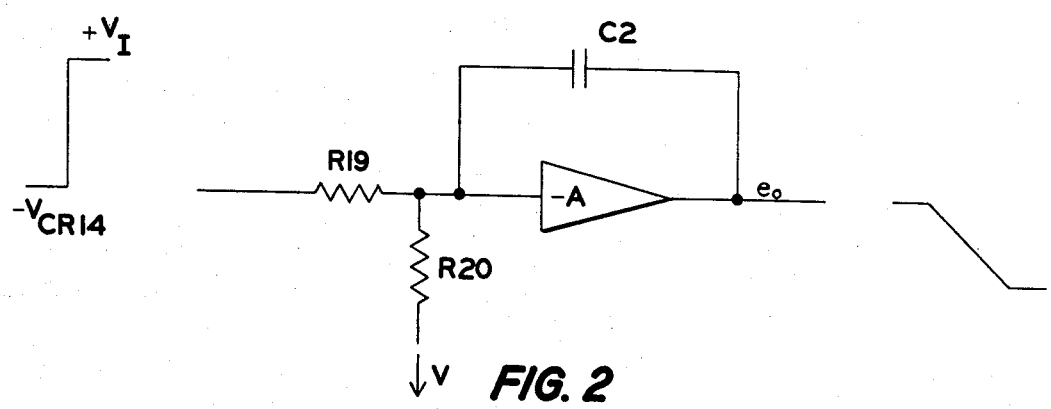
FIGS. 2 to 4 are equivalent circuit representations helpful in understanding the principles of the present invention embodied in FIG. 1.
Figure 3:
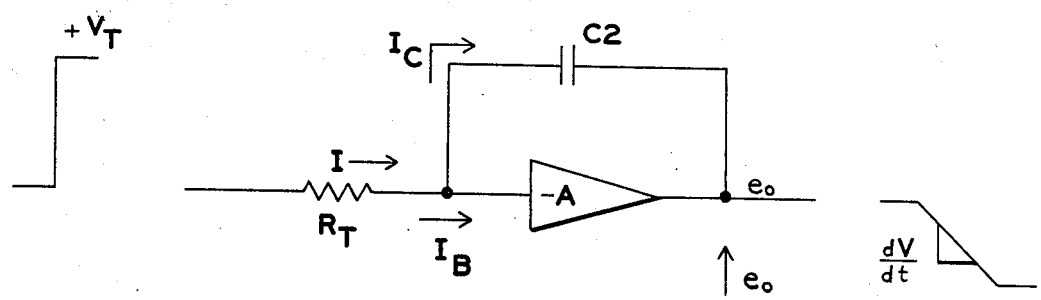

The square wave input now coupled to the base of transistor Q8 enables the transistor at the positive excursions of the square wave input. That is, transistor Q8 is on when the square wave signal is at 10 volts and is off when the square wave signal is at ground. With transistor Q8 in the on state, current flows from the positive voltage supply through resistor R18, transistor Q8, resistors R19 and 20 back to a negative voltage supply. Current divider R19 and R20 provide a division of current of the amplified signal from transistor Q8. The current signal at point A is a signal the shape of which is the same as the voltage signal applied at input 1 to the circuit, assuming the base current $I_B$ is negligible. As transistor Q18 turns on due to the current signal at point A in FIG. 1, it passes through a linear region before saturating. While in this linear region transistor Q18 behaves as a high gain amplifier the equivalent circuit of which is illustrated in FIG. 2. Applying Thevenins theorem, the circuit of FIG. 2 is reduced to the circuit seen in FIG. 3, that of a classical integrator. In FIG. 3, the following relationships are derived:

$$R_T = \frac{R19 \times R20}{R19 + R20}$$

$$V_T = \frac{R20(V+V_I)}{R19+R20} - V$$

$$I_c = I - I_B$$
$$dV/dt = (I - I_B)/C2$$

A step input, therefore, results in a ramp output as shown; thus the output fall time is controlled and linear. Having gone through the linear region transistor Q18 is driven into saturation and then behaves as a saturated switch. With transistor Q18 conducting, the motor drive source 3 has a return path through the motor winding and transistor Q18, thereby applying the operating potential to the motor winding.

Figure 4:
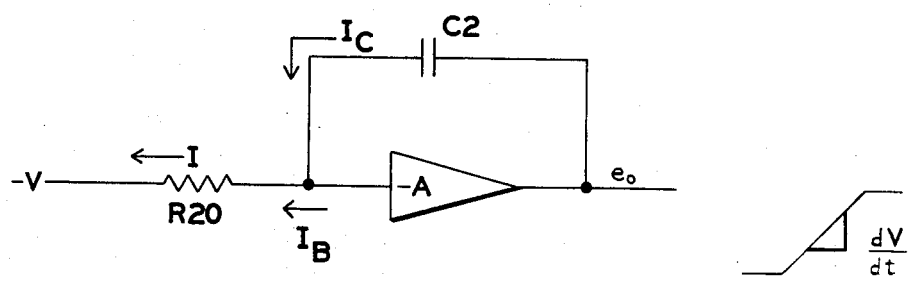

When the signal on the base of transistor Q8 returns to ground potential, the transistor becomes disabled thereby opening the base-emitter circuit of transistor Q8 coupled to resistor R19. Again transistor Q18 goes through a linear region in going from saturation to cut-off. The equivalent circuit is shown in FIG. 4 with these relationships:

$$I_c = I - I_B$$
$$dV/dt = (I - I_B)/C2$$

Due to the high voltage and current passing through the motor winding, the inductance therein causes a store of energy to flow back to the collector of transistor Q18. The integration effect caused by capacitor C2 and resistor R20 controls the rise time of the output signal and eliminates the transients caused by the inductance of the motor winding and the extraordinary potentials that could appear across the collector-base junction of transistor Q18. Diode CR14 allows a current to flow from ground through the diode in the event that a large voltage transient may occur across the emitter-base junction of transistor Q18. Thus, by controlling the rise and fall times of the output signal by effectively integrating the input signals, the feedback capacitor C2 prevents the exposure of transistor Q18 to large transient voltages and currents from the motor which may otherwise burn out or destroy the transistor.

If the motor or inductive load has similar but opposite phase windings, a circuit symmetrical to the circuit described above is provided, which operates in a similar manner. Thus, at input 2 a signal similar to that applied to input 1, but 180° out of phase thereto, is applied to the base of transistor Q9. This signal enables transistor Q9 in a similar manner as was transistor Q8 and thus current flows through resistor R6, transistor Q9 and resistors R2 and R21 back to the negative voltage supply source. The current signal appearing at the junction between resistors R2 and R21 is coupled to the base of transistor Q11. Thus, transistor Q11 is enabled and disabled in a manner similar to that of transistor Q18, but at opposite phases of the input signal. That is, when transistor Q18 is on, transistor Q11 is off and vice versa. Thus, motor drive source 3 is alternately coupled to the different windings of the motor circuit through transistors Q18 and Q11. Diode CR15 in a manner similar to that for diode CR14 protects the base-emitter junction of transistor Q11 from an extraordinary voltage transient due to the breakdown of the field in the motor winding. Capacitor C3 and resistor R21 in a manner similar to that for capacitor C2 and resistor R21 operates to control the rise time of the output signal and eliminate transients in the establishment and breakdown of the field in the motor windings.

The supply signals applied to input terminals 1 and 2 may be supplied by a source of any known frequency. Accordingly, the circuitry described herein presents the motor drive winding with faithfully reproduced signal frequencies for maintaining a precise drive signal while protecting the circuit from signal transients and other noise effects in the system. The present invention provides for a significant cost reduction with a more reliable operation with lower transient radiation. Further, the reduced circuitry presented herein provides for impedance protection for the drive transistors Q11 and Q18 with a controlled rise and fall time of the signal presented to the drive motor.

In the foregoing there has been disclosed apparatus for effectively driving a motor or other inductive load with a precise frequency signal source with minimum transient generation. While the circuitry herein has been described with particular signal voltage levels and frequency, it is understood by those skilled in the art that various changes may be made and equilvalents may be substituted for elements thereof without departing from the true spirit and scope of the invention. In addition, many modifications may be made to adapt to a particular situation without departing from the essential teachings of the invention.

WHAT IS CLAIMED IS:

1. A switching amplifier comprising:
transistor means responsive to input operating alternating current signals for selectively connecting and disconnecting an external source potential to an inductive load, and
capacitor means coupled to the collector and base electrodes of said transistor means for controlling the rise and fall times in the output signal therefrom to prevent exposure of said transistor means to large voltage and current transients from said inductive load, and
diode means coupled to the emitter and base electrodes of said transistor means for shunting large signal transients that may appear across the emitter-base junction of said transistor means due to the collector-base junction being forward biased from an inductive motor load with transformer coupling.

2. The switching amplifier as set forth in claim 1 further including:
second transistor means coupled to a source of square wave alternating current signals for generating said operating alternating current signals of predetermined voltage and current characteristics which are coupled to said first mentioned transistor means.

3. The switching amplifier as set forth in claim 2 further including a symmetrical circuit responsive to signals of the opposite phase with respect to said source of square wave alternating current signals, said symmetrical circuit comprising
third transistor means responsive to said opposite phase signals for generating operating alternating current signals of predetermined voltage and current characteristics,
fourth transistor means coupled to said third transistor means and responsive to said operating alternating current signals for selectively connecting and disconnecting said external source potential to a second inductive load,
second capacitor means coupled to the collector and base electrodes of said fourth transistor means for controlling the rise and fall times in the output signal therefrom to prevent exposure of said fourth transistor means to large voltage and current transients from said second inductive load, and
second diode means coupled to the emitter and base electrodes of said fourth transistor means for shunting large signal transients that may appear across the emitter-base junction of said fourth transistor means due to the collector-base junction being forward biased from said inductive motor load with transformer coupling.

4. A transition integration switching amplifier for alternately connecting and disconnecting a drive source potential to an external inductive load in response to square wave alternating current input signals, said amplifier comprising:
transistor means responsive to said square wave alternating current signals for selectively connecting and disconnecting said drive source potential to said inductive load,
capacitor means coupled to the collector and base electrodes of said transistor means for integrating large signal transients generated by the inductance of said inductive load and applying said integrated signal in a negative feedback relationship to the base of said transistor means to thereby eliminate said signal transients, and
diode means coupled to the emitter and base electrodes of said transistor means for shunting large signal transients that may appear across said base-emitter junction of said transistor means.

5. The switching amplifier set forth in claim 4 further including a symmetrical circuit responsive to signals of the opposite phase with respect to said square wave alternating current input signals, said symmetrical circuit comprising:
second transistor means responsive to said opposite phase signals for selectively connecting and disconnecting said drive source potential to a second inductive load,
second capacitor means coupled to the collector and base electrodes of said second transistor means for integrating large signal transients generated by the inductance of said second inductive load and applying said integrated signal in a negative feedback relationship to the base of said second transistor means to thereby eliminate said signal transients, and
second diode means coupled to the emitter and base electrodes of said second transistor means for shunting large signal transients that may appear across said base-emitter junction of said second transistor means.

* * * * *